(12) United States Patent
Trebtoske et al.

(10) Patent No.: US 11,046,342 B2
(45) Date of Patent: Jun. 29, 2021

(54) UTILITY CART

(71) Applicants: Robert P. Trebtoske, Swartz Creek, MI (US); James J. Shumaker, Swartz Creek, MI (US)

(72) Inventors: Robert P. Trebtoske, Swartz Creek, MI (US); James J. Shumaker, Swartz Creek, MI (US)

( * ) Notice: Subject to any disclaimer, the term of this patent is extended or adjusted under 35 U.S.C. 154(b) by 0 days.

(21) Appl. No.: 16/532,104

(22) Filed: Aug. 5, 2019

(65) Prior Publication Data
US 2020/0039552 A1 Feb. 6, 2020

Related U.S. Application Data

(60) Provisional application No. 62/714,352, filed on Aug. 3, 2018.

(51) Int. Cl.
*B62B 3/00* (2006.01)
*B62B 3/04* (2006.01)

(52) U.S. Cl.
CPC ............... *B62B 3/002* (2013.01); *B62B 3/001* (2013.01); *B62B 3/04* (2013.01)

(58) Field of Classification Search
CPC ........... B62B 3/001; B62B 3/002; B62B 3/02; B62B 3/007; B62B 1/208; B62B 3/025
See application file for complete search history.

(56) References Cited

U.S. PATENT DOCUMENTS

| | | | | |
|---|---|---|---|---|
| 2,800,335 A * | 7/1957 | Clapp | ............... | B62B 1/208 280/42 |
| 4,669,743 A * | 6/1987 | Tipke | ............... | B62B 1/208 280/42 |
| 4,768,806 A * | 9/1988 | Tetreault | ............... | B62D 63/061 280/124.179 |
| 4,878,682 A * | 11/1989 | Lee | ............... | B62B 3/025 280/42 |
| 6,773,025 B1 * | 8/2004 | Zelm | ............... | B62D 63/061 280/40 |
| 7,097,182 B1 * | 8/2006 | Liu | ............... | B62B 3/02 280/42 |
| 7,452,000 B2 * | 11/2008 | Winter | ............... | B62D 63/061 280/42 |
| 2003/0062707 A1 * | 4/2003 | Koch | ............... | B62D 63/061 280/401 |
| 2004/0217578 A1 * | 11/2004 | Sawyer | ............... | B62D 63/061 280/656 |

* cited by examiner

*Primary Examiner* — Brian L Swenson
(74) *Attorney, Agent, or Firm* — Harness, Dickey & Pierce, P.L.C.

(57) ABSTRACT

A utility cart includes a flooring apparatus and a pair of wheels. The flooring apparatus includes first and second bracket assemblies and first and second panel members. The first and second panel members are movable relative to the first and second bracket assemblies between an unfolded position in which the first and second panel members extend horizontally and a folded position in which the first and second panel members extend vertically. One wheel of the pair of wheels is attached to the first bracket assembly and another wheel of the pair of wheels is attached to the second bracket assembly. The flooring apparatus is disposed between the pair of wheels when the first and second panel members are in the unfolded position and the folded position.

14 Claims, 23 Drawing Sheets

UTILITY CART

CROSS-REFERENCE TO RELATED APPLICATIONS

This application claims the benefit of U.S. Provisional Application No. 62/714,352, filed on Aug. 3, 2019. The entire disclosure of the above application is incorporated herein by reference.

FIELD

The present disclosure relates to a foldable utility cart.

BACKGROUND

This section provides background information related to the present disclosure which is not necessarily prior art.

Utility carts may be used to transport cargo (e.g., goods) from one place to another. Utility carts are often large and heavy, thus, making it difficult to package and ship the utility cart to a user. The present disclosure provides a durable utility cart that features a light-weight, compact foldable storage design that allows the utility cart to be conveniently packaged, folded and stored with a small foot print for storage area, shipping purposes, and end user convenience.

SUMMARY

This section provides a general summary of the disclosure, and is not a comprehensive disclosure of its full scope or all of its features.

In one form, the present disclosure provides a durable utility cart including a flooring apparatus and a pair of wheels. The flooring apparatus includes first and second bracket assemblies and first and second panel members. The first and second panel members are movable relative to the first and second bracket assemblies between an unfolded position in which the first and second panel members extend horizontally and a folded position in which the first and second panel members extend vertically. One wheel of the pair of wheels is attached to the first bracket assembly and another wheel of the pair of wheels is attached to the second bracket assembly. The flooring apparatus is disposed between the pair of wheels when the first and second panel members are in the unfolded position and the folded position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 12:
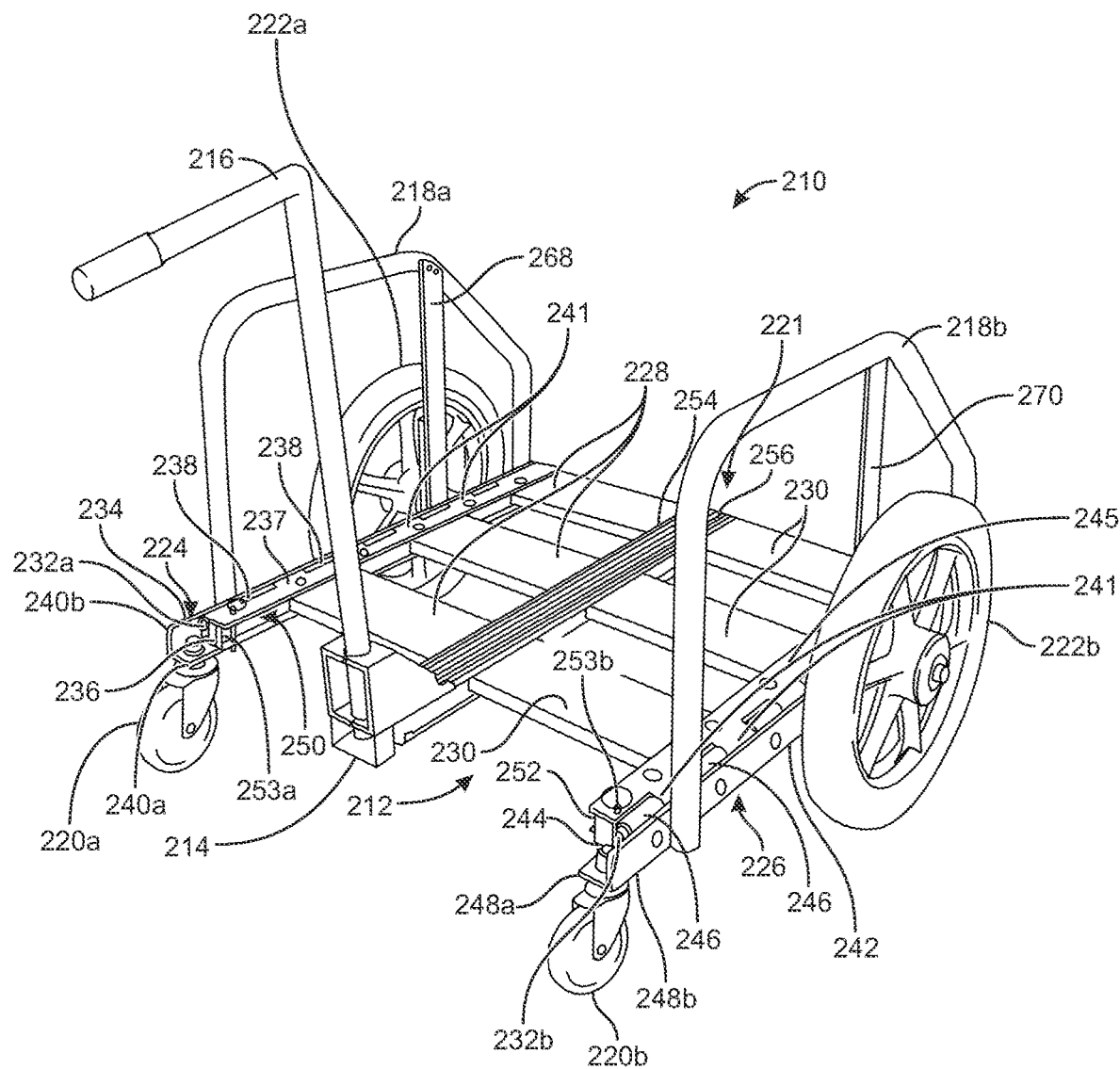
Figure 13:
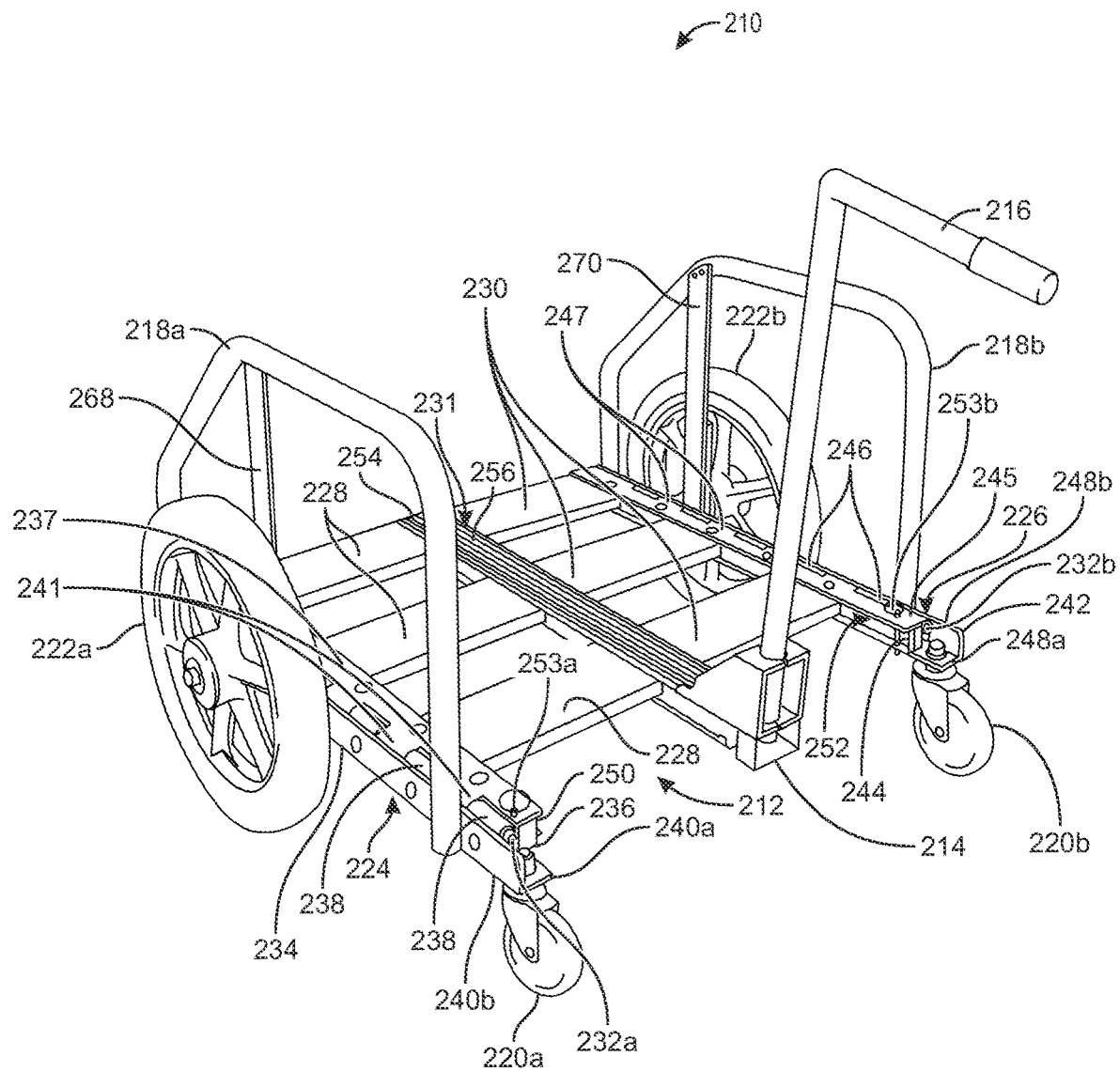
Figure 14:
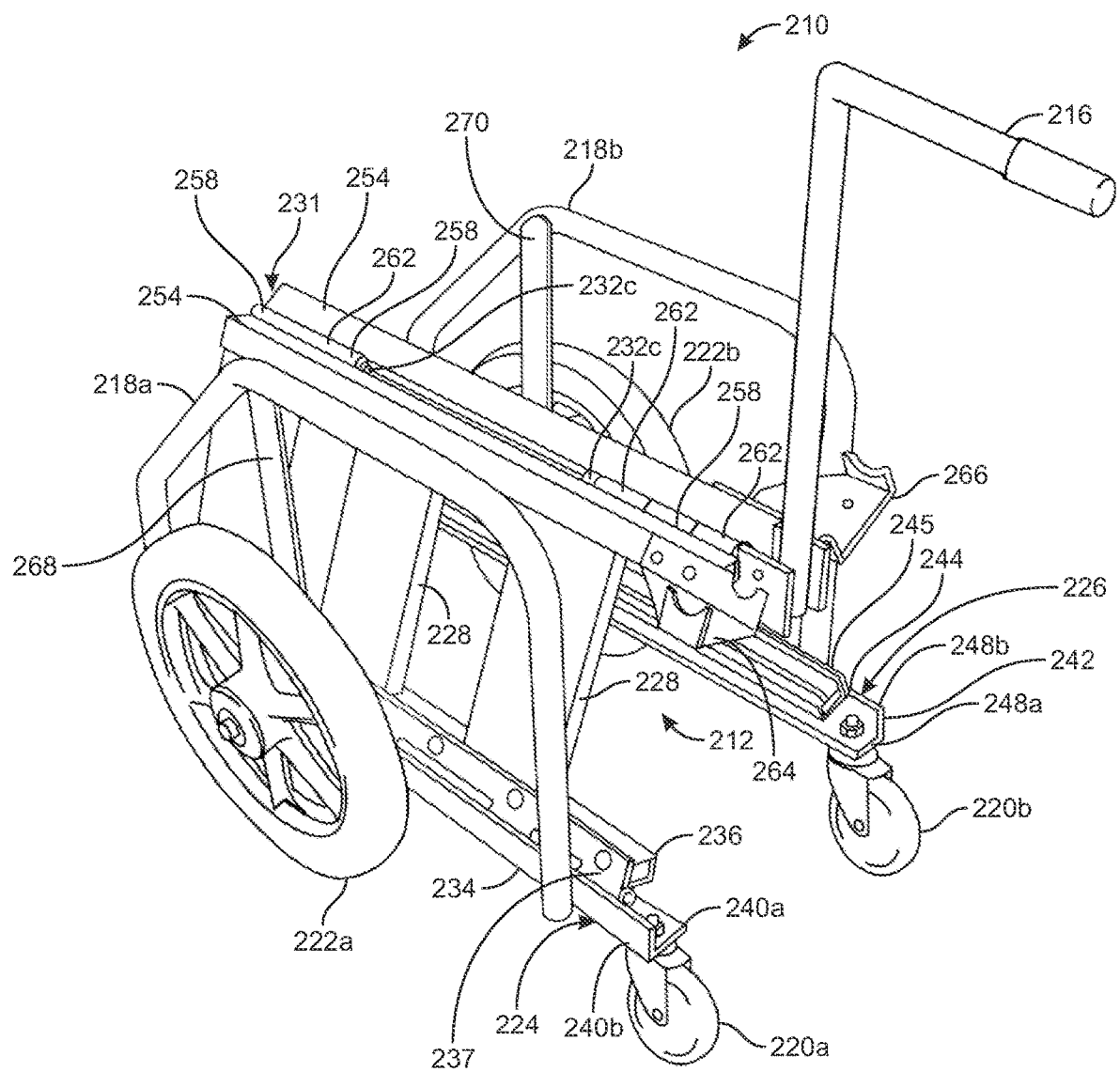
Figure 15:
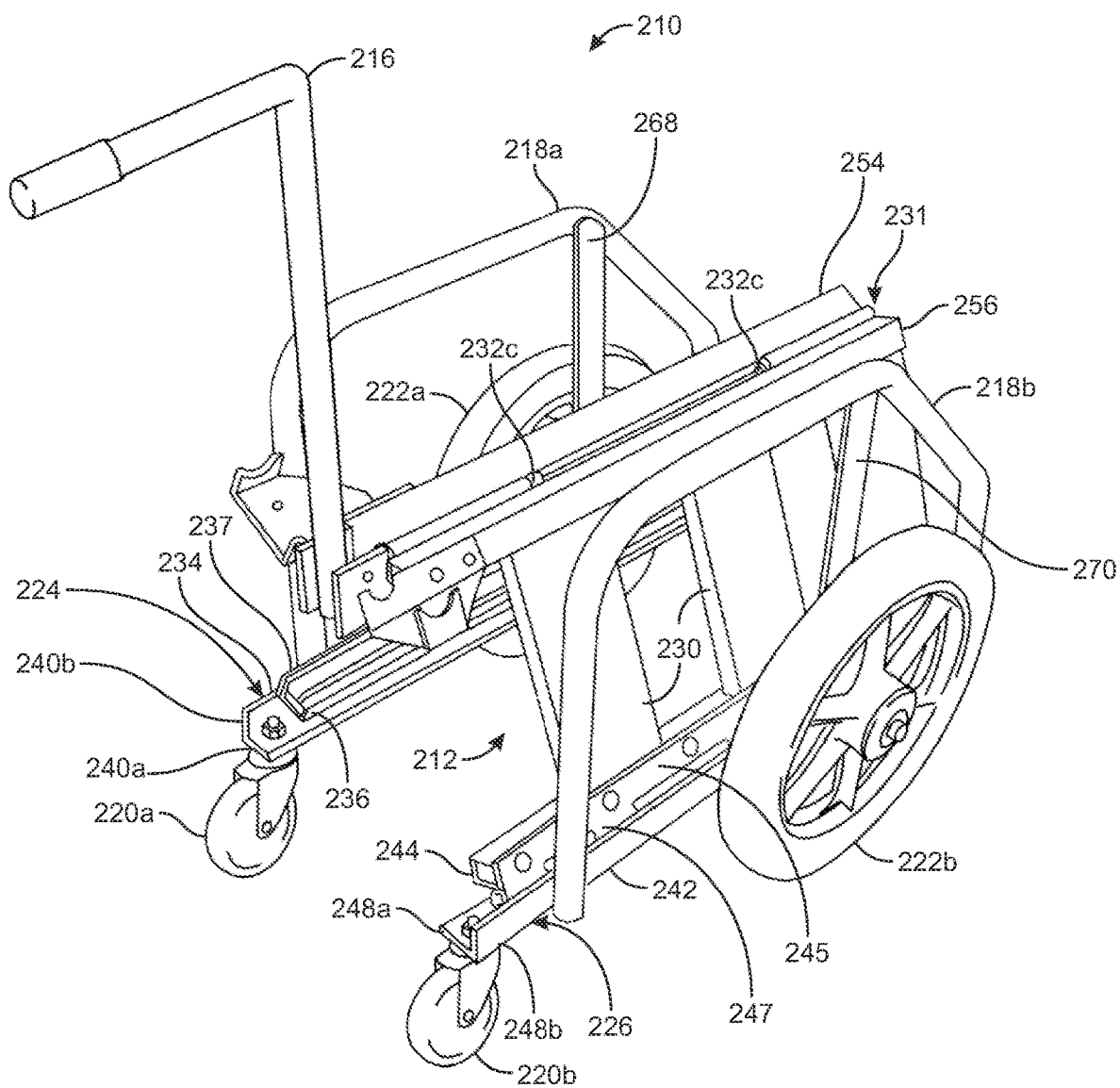
Figure 16:
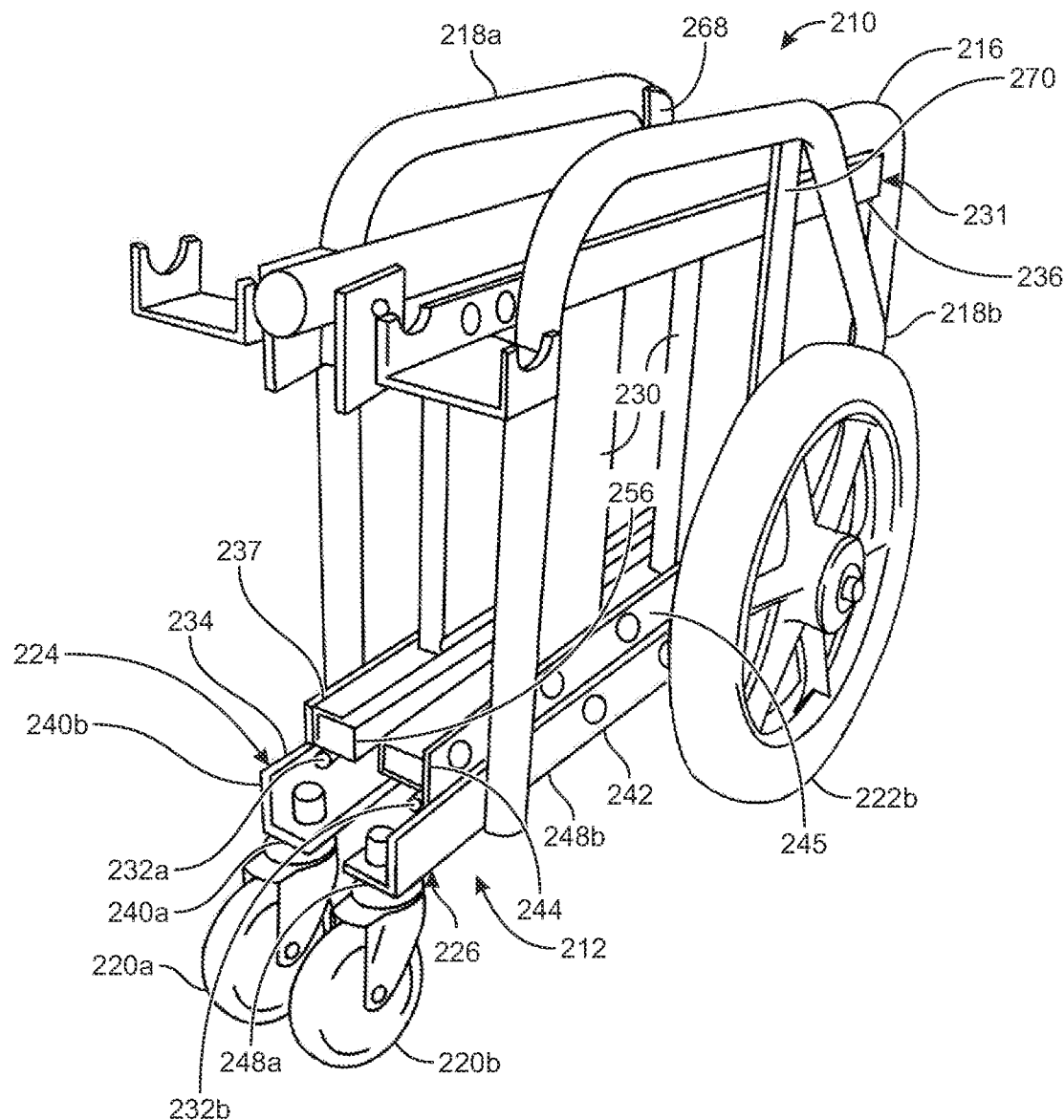
Figure 17:
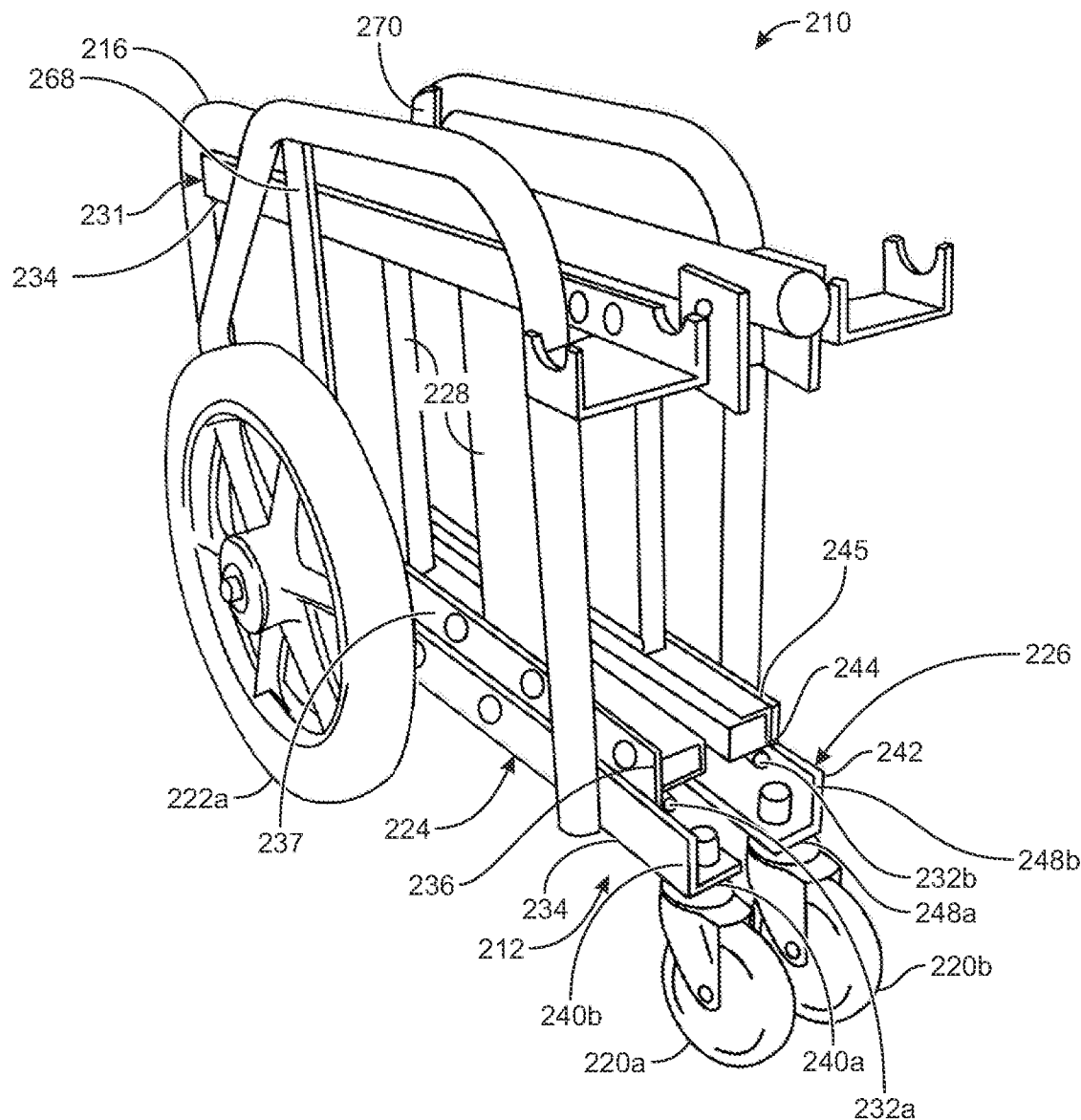
Figure 18:
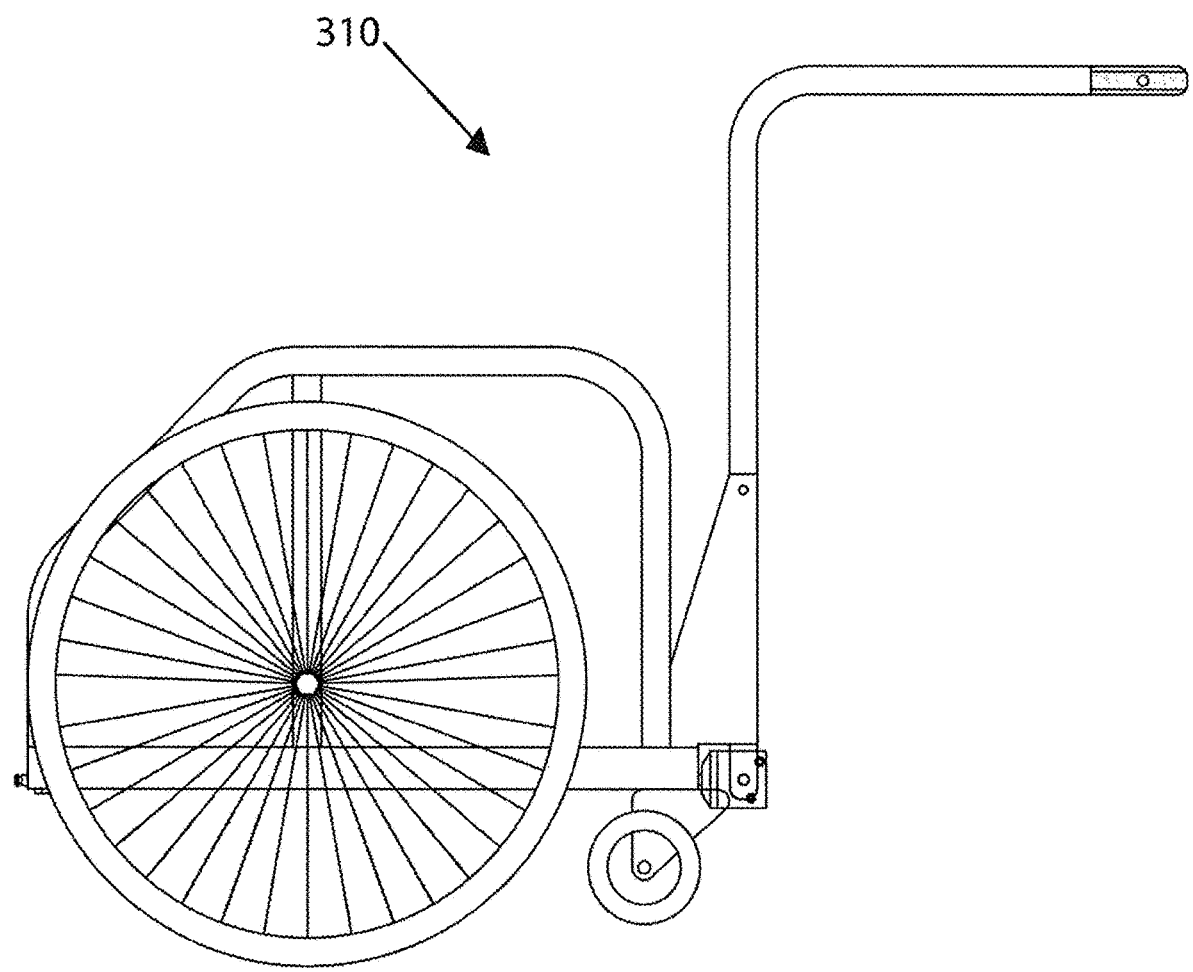
Figure 19:
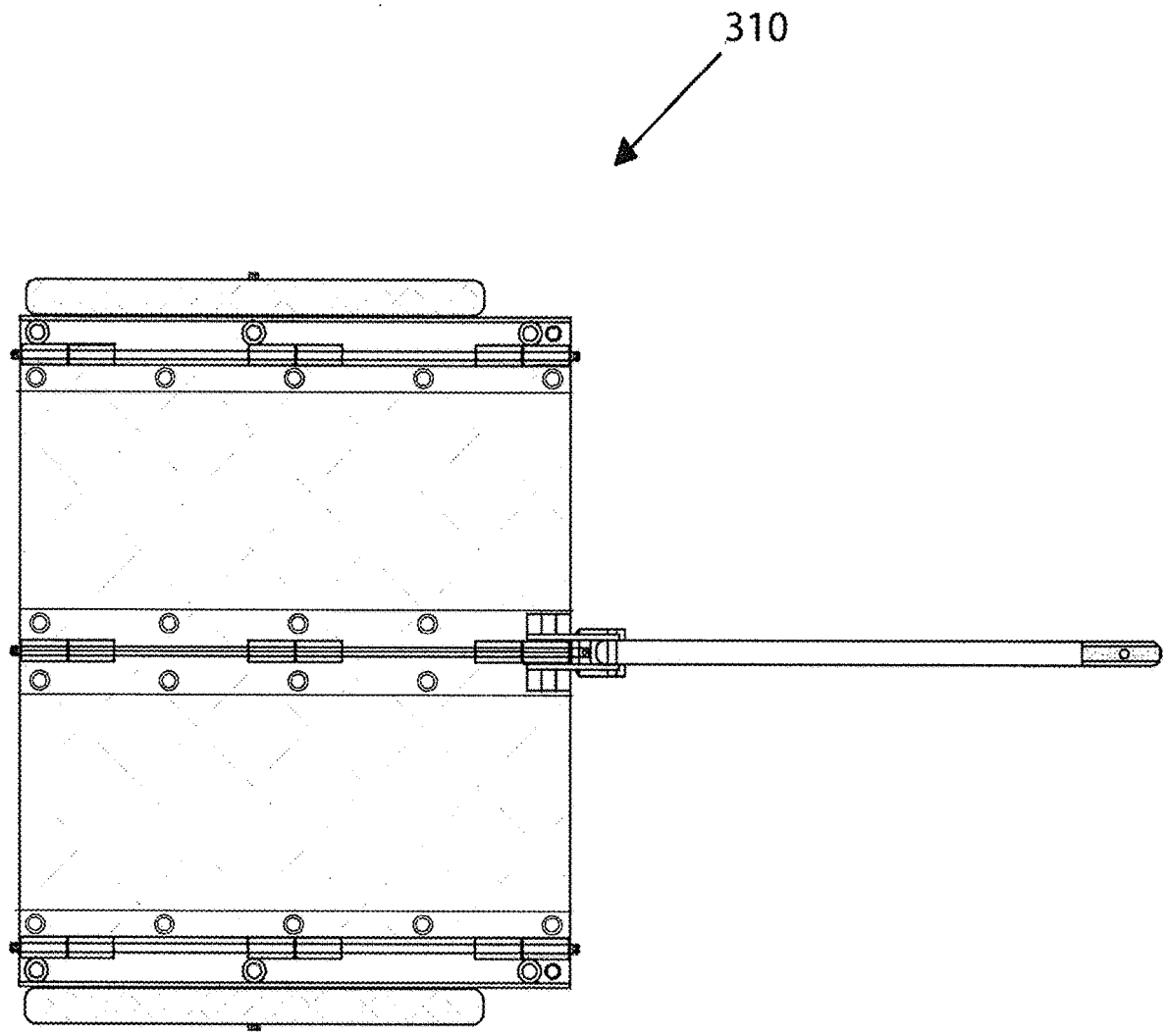
Figure 20:
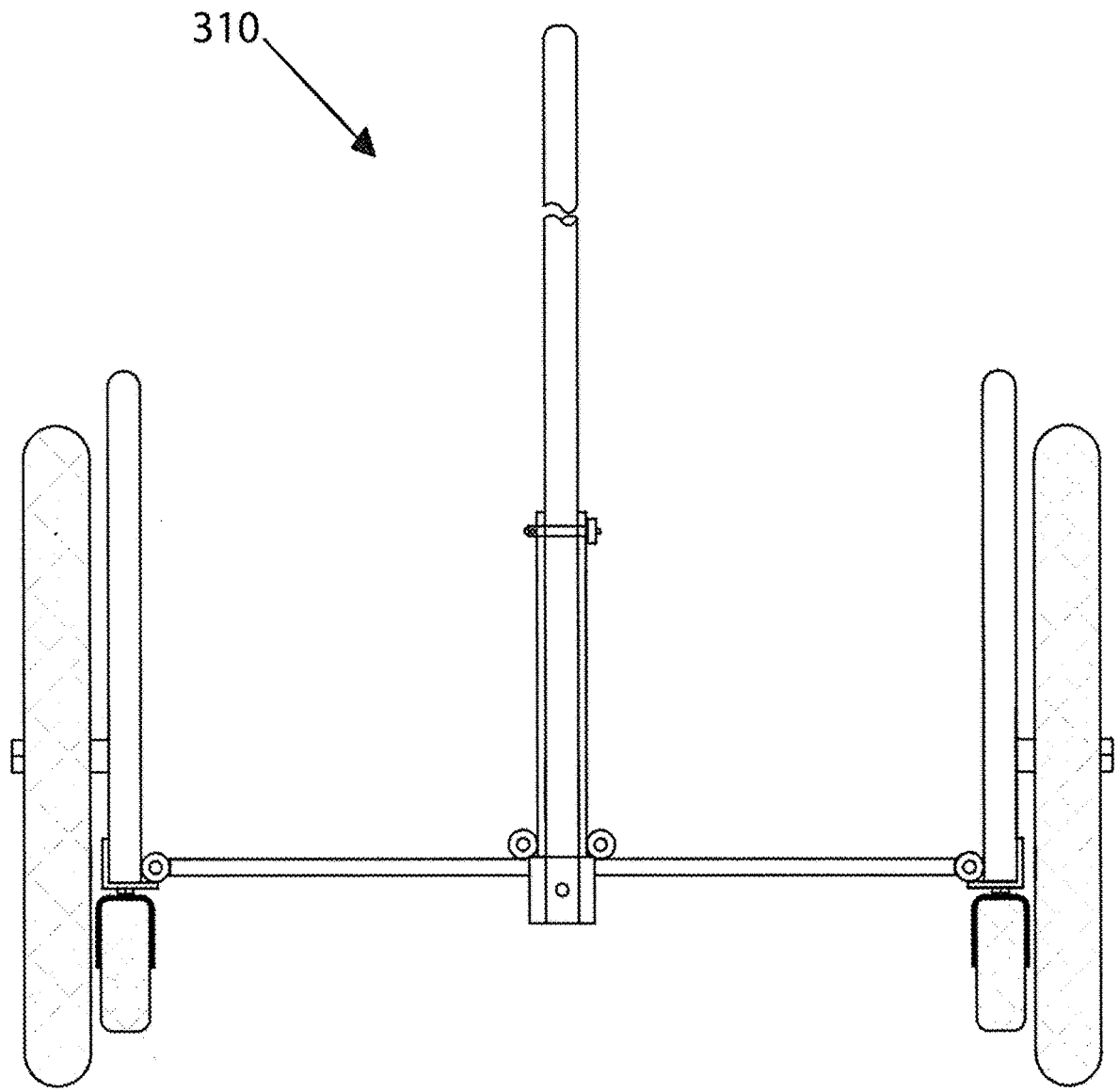
Figure 21:
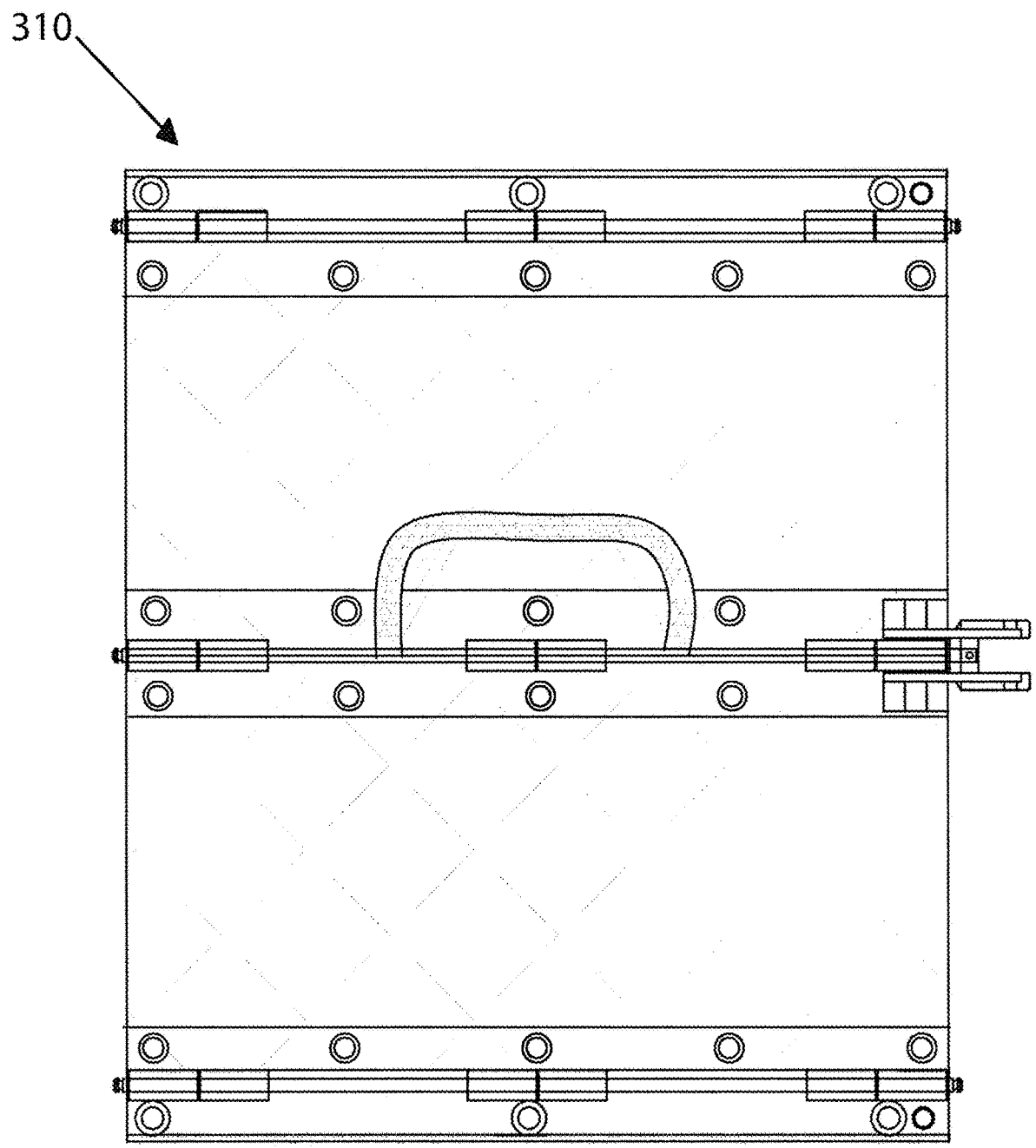

FIGS. 11(a)-11(e) show various views of the spring loaded pins for locking the cart handle in a desired position;

FIG. 12 is a perspective view of an alternate utility cart in a deployed position;

FIG. 13 is another perspective view of the utility cart of FIG. 12 in the deployed position;

FIG. 14 is a perspective view of the utility cart of FIG. 12 being moved from the deployed position to a stowed position;

FIG. 15 is another perspective view of the utility cart of FIG. 12 being moved from the deployed position to the stowed position;

FIG. 16 is a perspective view of the utility cart of FIG. 12 in the stowed position;

FIG. 17 is another perspective view of the utility cart of FIG. 12 in the stowed position;

FIG. 18 is a perspective view of an alternate utility cart in a deployed position;

FIG. 19 is a top view of the cart of FIG. 18;

FIG. 20 is a back view of the cart of FIG. 18;

FIG. 21 is a bottom view of the cart of FIG. 18; and

Figure 22:
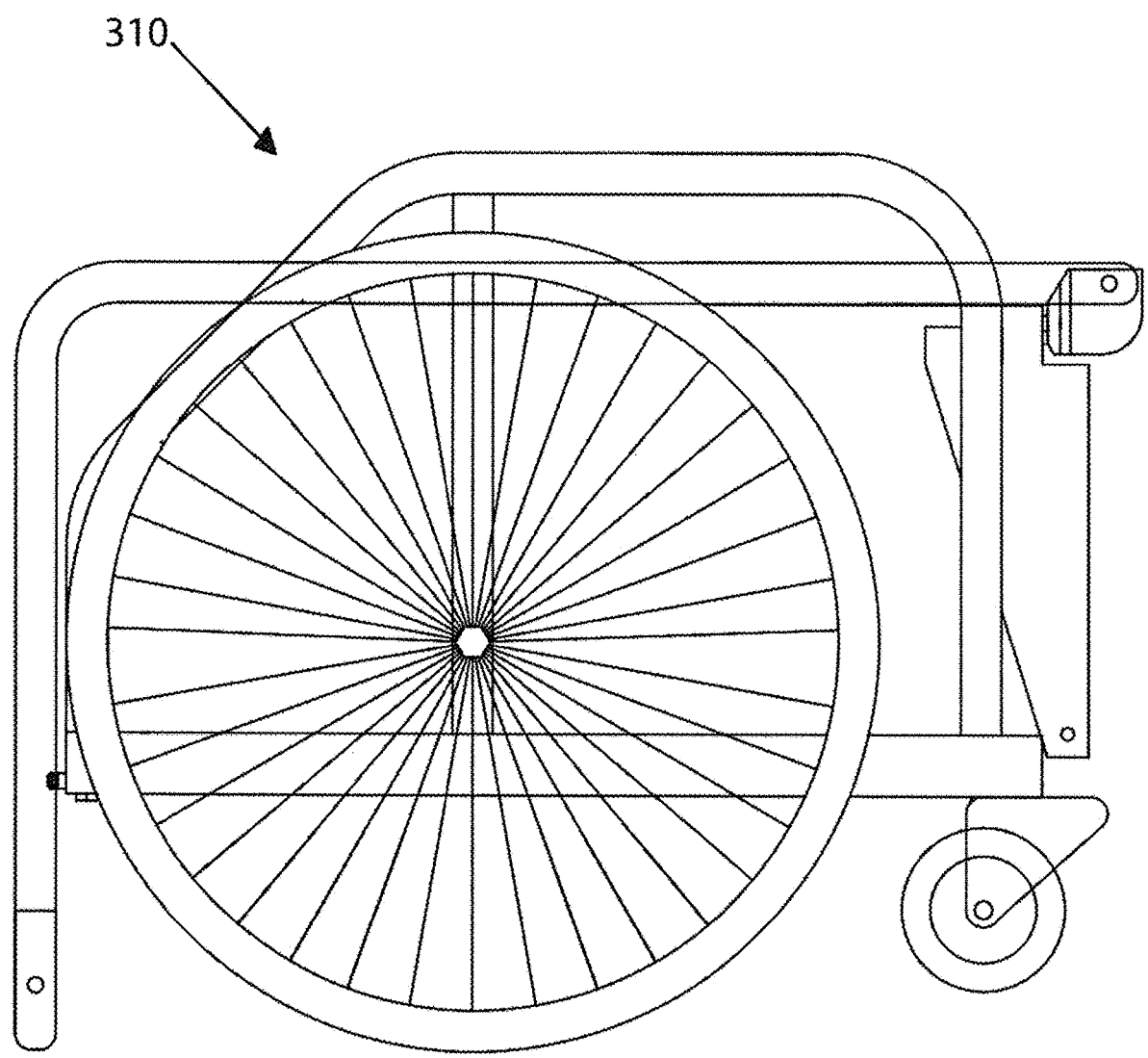

FIG. 22 is a side view of the cart of FIG. 18 in the stowed position.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-7, a utility cart 10 is provided. The utility cart 10 may be attached to a vehicle (e.g., bicycle, motor-scooter, tractor or all-terrain vehicle) or manually by a user to transport cargo (e.g., goods) from one place to another. The utility cart 10 may be movable between a stowed position (FIGS. 6 and 7) in which the utility cart 10 which is constructed to be both durable, and, at the same time, lightweight, can be conveniently packaged and shipped via a carrier, for example, and a deployed position (FIGS. 1-3) in which the utility cart 10 may be usable (e.g., transport the cargo from one place to another).

The utility cart 10 may include a floor apparatus 12, a U-shaped yoke 14, a handle 16, a pair of rails 18a, 18b, a first pair of wheels 20a, 20b and a second pair of wheels 22a, 22b. The floor apparatus 12 may include a first bracket assembly 24, first and second support assemblies 25a, 25b, a second bracket assembly 26, third and fourth support assemblies 27a, 27b, a first panel member 28, a second panel member 30, fifth and sixth support assemblies 31a, 31b and a plurality of rods 32a, 32b, 32c.

Figure 1:
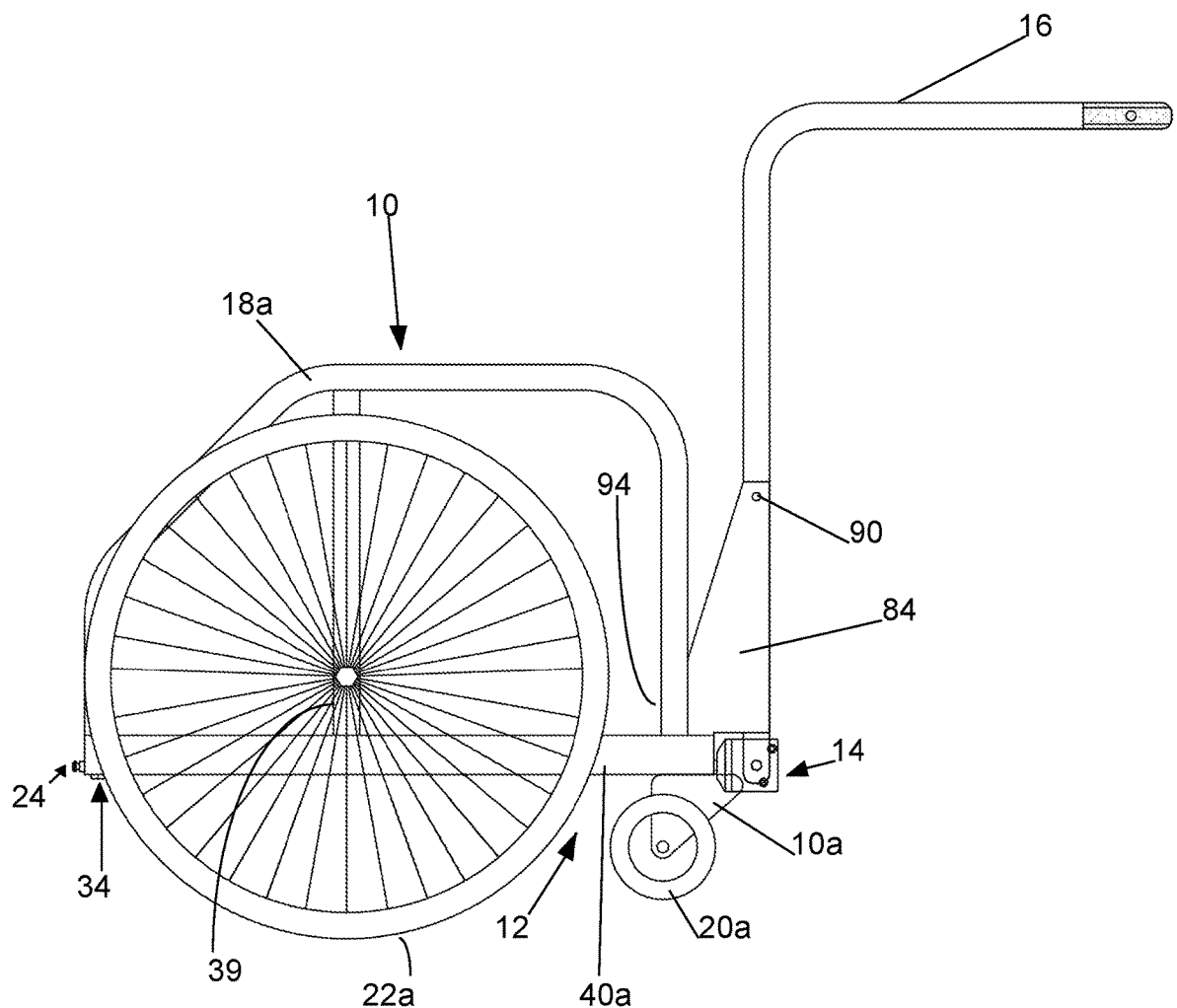
FIG. 1 is a side view of the utility cart in the deployed position according to the principles of the present disclosure.
Figure 2:
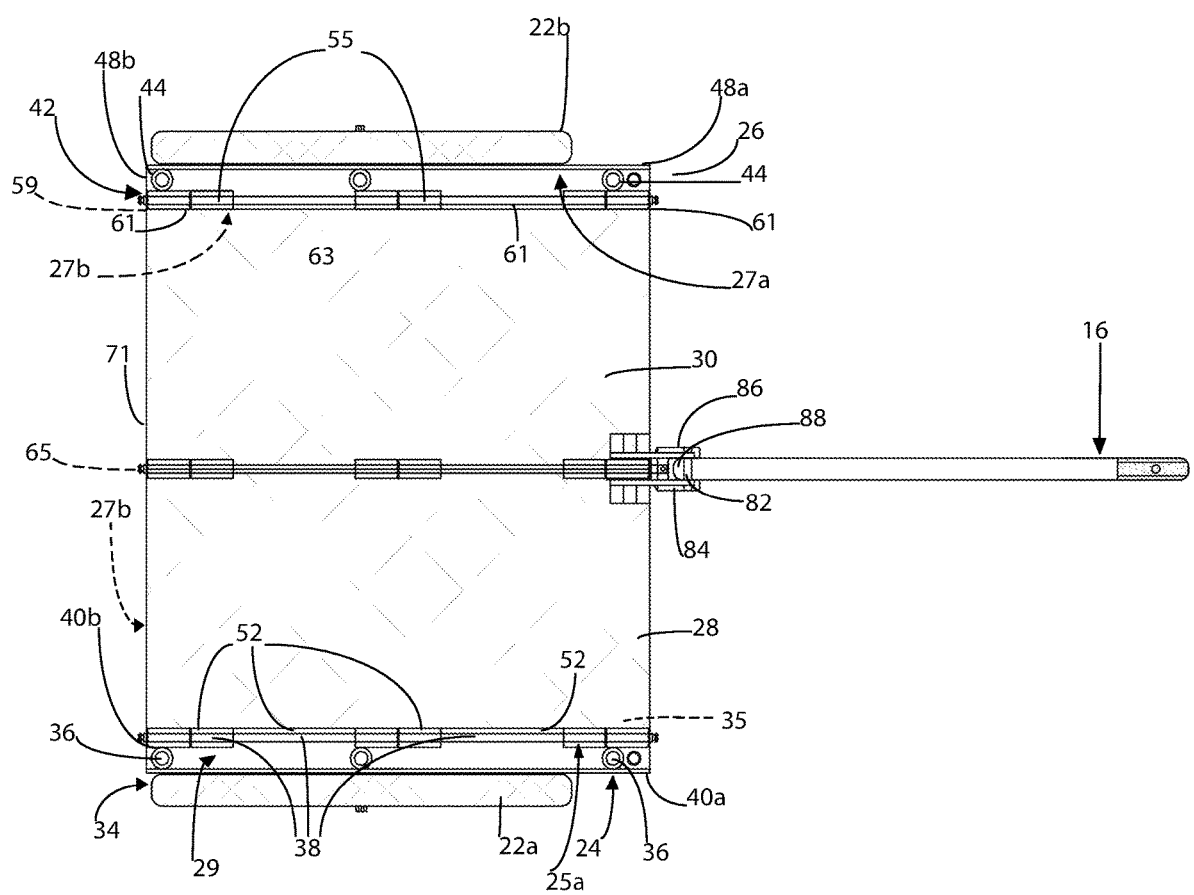
FIG. 2 is a top view of the utility cart of FIG. 1.
Figure 3:
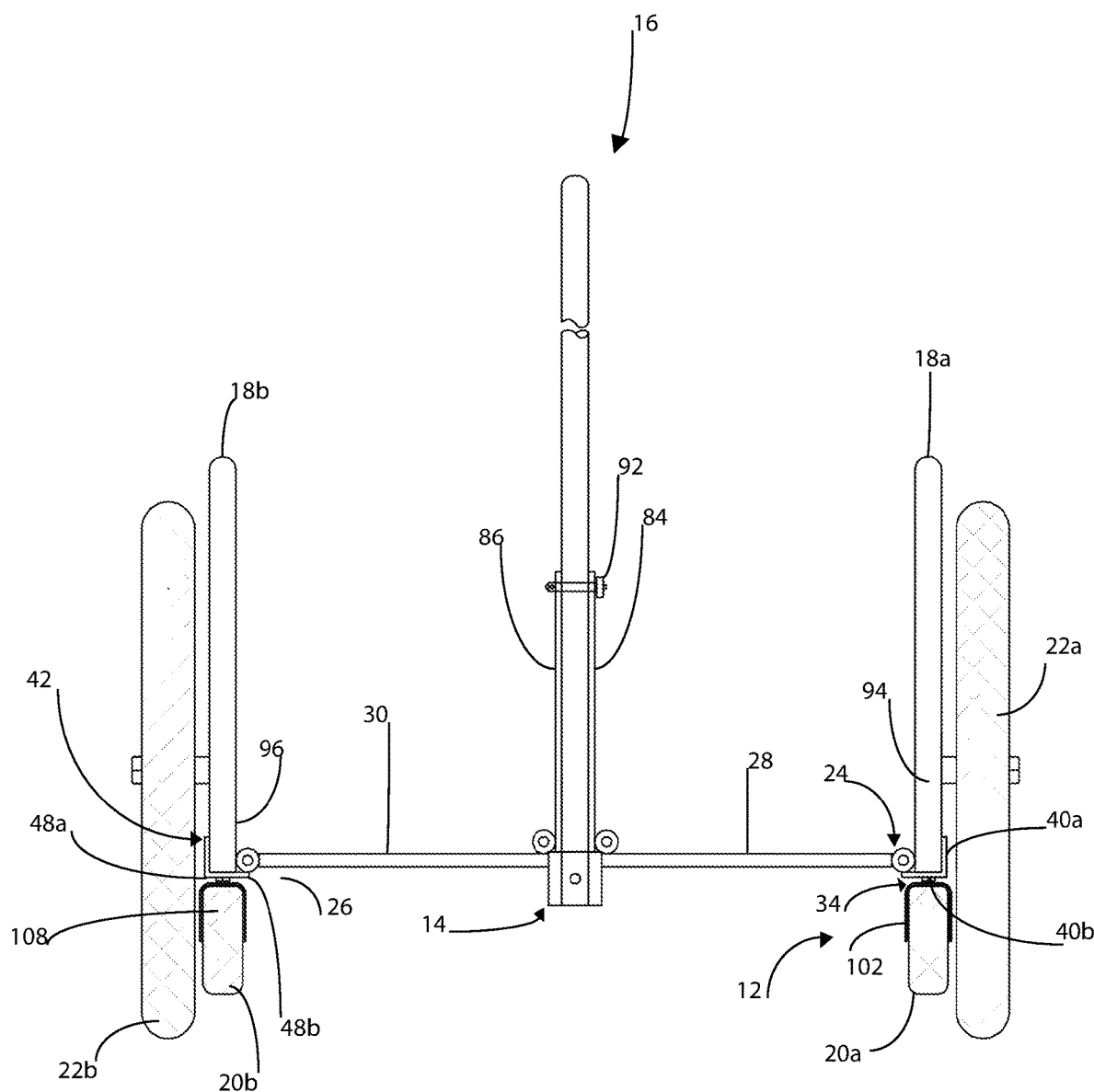
FIG. 3 is a front view of the utility cart of FIG. 1.

The first bracket assembly 24 may be made of lightweight aluminum, steel, titanium, carbon composites or durable thermoplastics and combinations thereof and include an L-shaped bracket 34, a pair of seats 36 (FIG. 2) and a wheel support 39 (FIG. 1). The bracket 34 may include a first member 40a and a second member 40b extending perpendicularly from the first member 40a. As shown in FIG. 2, the pair of seats 36 may be attached (e.g., welded and/or bolted) to the top surface of the second member 40b and may be disposed at opposing ends thereof. The wheel support 39 may extend upwardly (e.g., welded and/or bolted) from the second member 40b.

The first support assembly 25a may include a plate 29 and a plurality of loops or hinges 38. The plate 29 may be disposed on a top surface of the second member 40b of the bracket 34 and may be attached to the second member 40b via fasteners 33 (e.g., rivets). The plurality of hinges 38 may extend from a periphery of the plate 29 such that the plurality of hinges 38 are spaced apart from each other. The second support assembly 25b may include a plate 35 and a plurality of loops or hinges 52. The plate 35 may be attached to a periphery of the first panel member 28 via fasteners 43 (e.g., rivets). The plurality of hinges 52 may extend from a periphery of the plate 35 such that the plurality of hinges 52 are spaced apart from each other. Each hinge 52 is disposed in a corresponding space adjacent to the plurality of hinges 38 such that the plurality of hinges 52 of the second support assembly 25b and the plurality of hinges 38 of the first support assembly 25a are arranged in an alternating fashion and form a linear opening extending therethrough.

The second bracket assembly 26 may be made of lightweight aluminum, steel, titanium, carbon composites or durable thermoplastics and combinations thereof and include an L-shaped bracket 42, a pair of seats 44 (FIG. 2) and a wheel support (not shown). The bracket 42 may include a first member 48a and a second member 48b extending perpendicularly from the first member 48a. As shown in FIG. 2, the pair of seats 44 may be attached (e.g., welded) to a top surface of the second member 48b and may be disposed at opposing ends thereof. The wheel support (not shown) may extend upwardly from the second member 48b.

The third support assembly 27a may include a plate 53 and a plurality of loops or hinges 55. The plate 53 may be disposed on a top surface of the second member 48b of the bracket 42 and may be attached to the second member 48b via fasteners 57 (e.g., rivets). The plurality of hinges 55 may extend from a periphery of the plate 53 such that the plurality of hinges 55 are spaced apart from each other. The fourth support assembly 27b may include a plate 59 and a plurality of loops or hinges 61. The plate 59 may be attached to a periphery of the second panel member 30 via fasteners 63 (e.g., rivets). The plurality of hinges 61 may extend from a periphery of the plate 59 such that the plurality of hinges 61 are spaced apart from each other. Each hinge 61 is disposed in a corresponding space adjacent to the plurality of hinges 55 such that the plurality of hinges 61 of the fourth support assembly 27b and the plurality of hinges 55 of the third support assembly 27a are arranged in an alternating fashion and form a linear opening extending therethrough.

The rectangular-shaped first panel member 28 may be made of lightweight aluminum, steel, titanium, carbon composites or durable thermoplastics and combinations thereof and include a bottom surface and a top surface 54. A periphery of the first panel member 28 may be disposed on a top surface of the second support assembly 25b (i.e., the bottom surface 51 of the first panel member 28 and the top surface of the plate 35 of the second support assembly 25b contact each other). The rectangular-shaped second panel member 30 may be made of lightweight aluminum, steel, titanium, carbon composites or durable thermoplastics and combinations thereof and include a bottom surface 60 and a top surface 62. A periphery of the second panel member 30 may be disposed on a top surface of the fourth support assembly 27b (i.e., the bottom surface 60 of the second panel member 30 and the top surface of the plate 59 of the fourth support assembly 27b contact each other).

The fifth support assembly 31a may include a plate 65 and a plurality of loops or hinges 67. The plate 65 may be disposed beneath a bottom surface of the first panel member 28 and may be attached to the first panel member 28 via fasteners 69 (e.g., rivets). The plurality of hinges 67 may extend from a periphery of the plate 65 such that the plurality of hinges 67 are spaced apart from each other. The sixth support assembly 31b may include a plate 71 and a plurality of loops or hinges 73. The plate 71 may be disposed beneath a bottom surface of the second panel member 30 and may be attached to the second panel member 30 via fasteners 75 (e.g., rivets). The plurality of hinges 73 may extend from a periphery of the plate 71 such that the plurality of hinges 73 are spaced apart from each other. Each hinge 73 is disposed in a corresponding space adjacent to the plurality of hinges 67 such that the plurality of hinges 73 of the sixth support assembly 31b and the plurality of hinges 67 of the fifth support assembly 31a are arranged in an alternating fashion and form a linear opening extending therethrough. As shown in FIG. 2, the fifth and sixth support assemblies 31a, 31b are hidden from the user's view when the utility cart 10 is in the deployed position, which improves the aesthetics of the utility cart 10 and optimizes the total surface area usable by the user.

Figure 4:
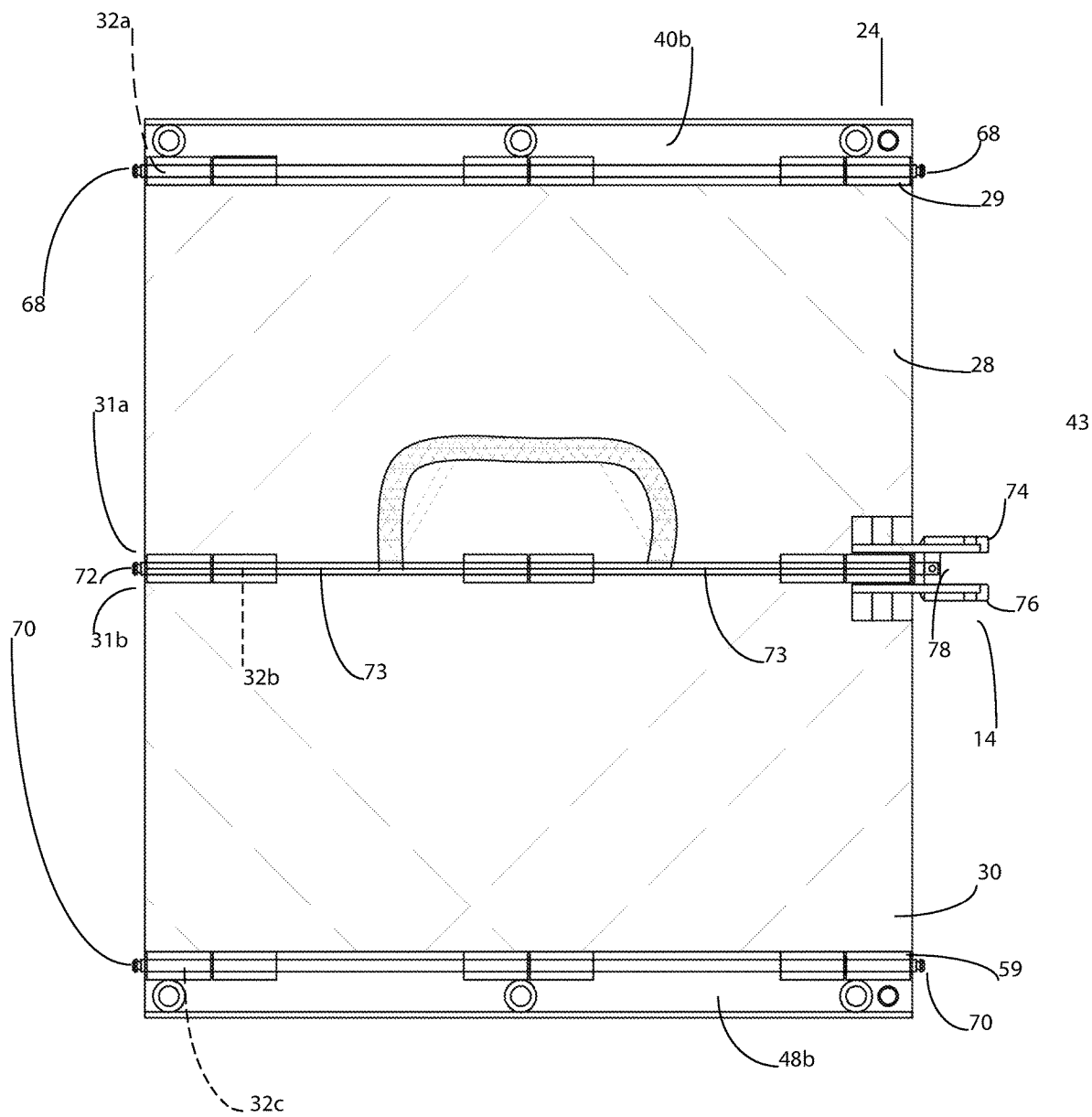
FIG. 4 is a bottom view of the floor of the utility cart of FIG. 1.
Figure 5:
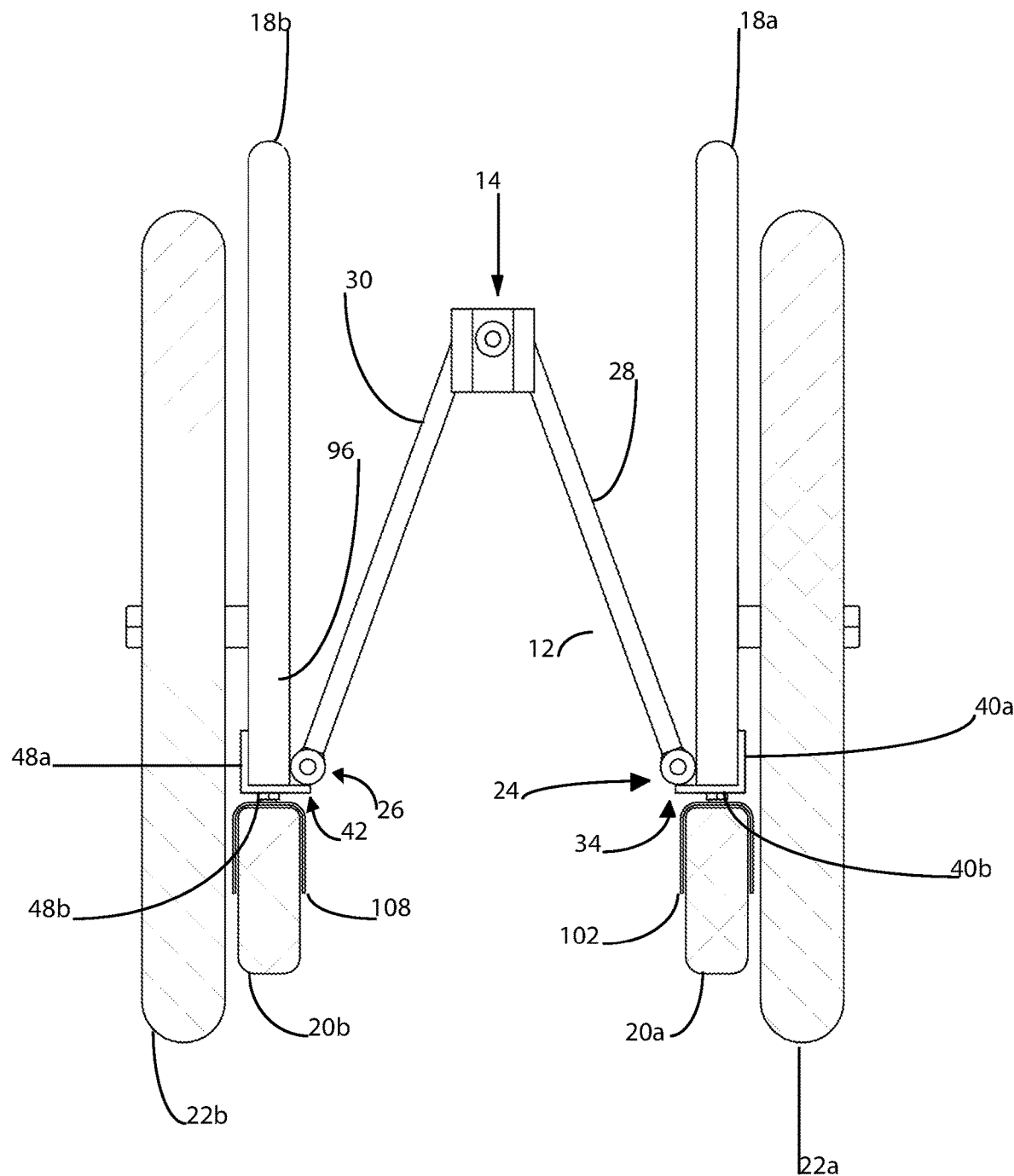
FIG. 5 is a front view of the utility cart in a partially stowed or folded position.
Figure 6:
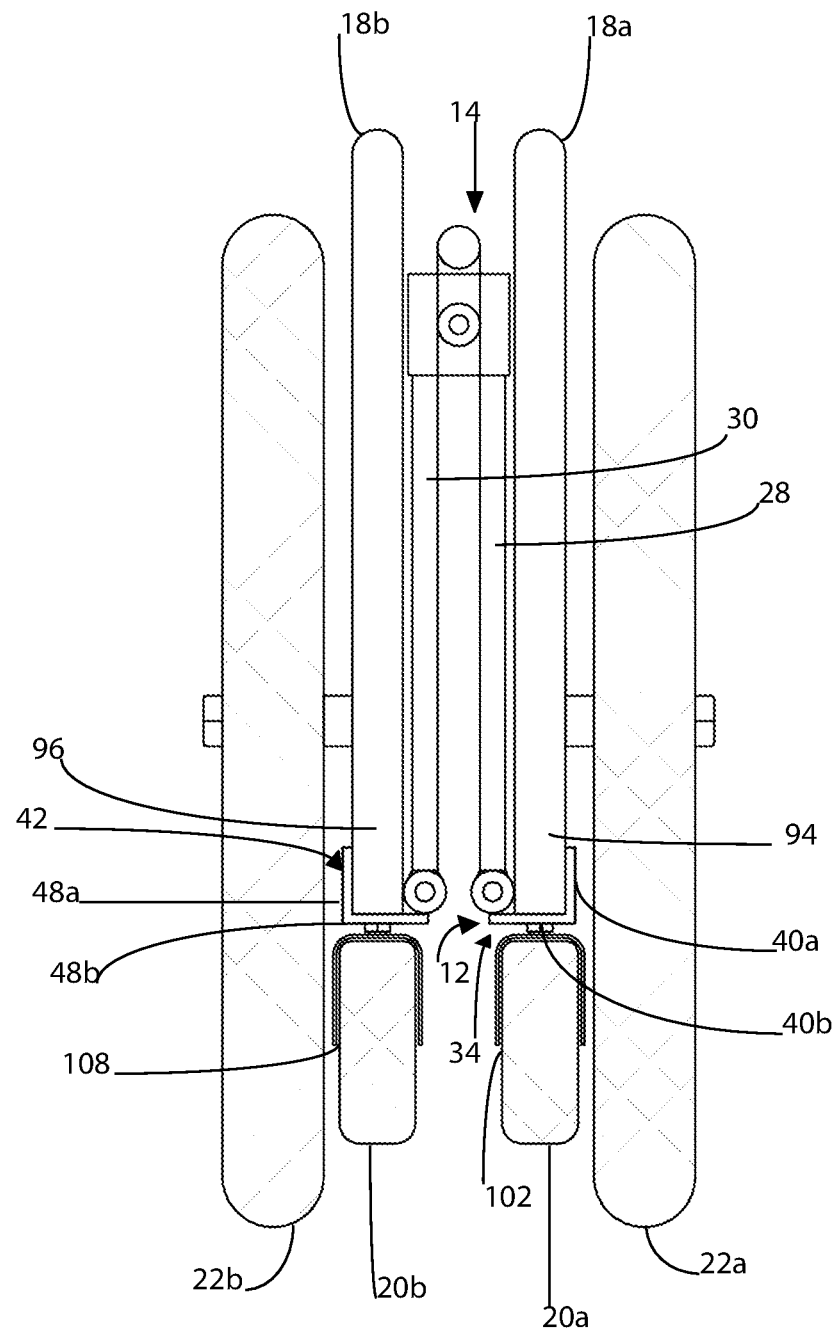
FIG. 6 is a front view of the utility cart shown without handle, in a fully stowed position.
Figure 7:
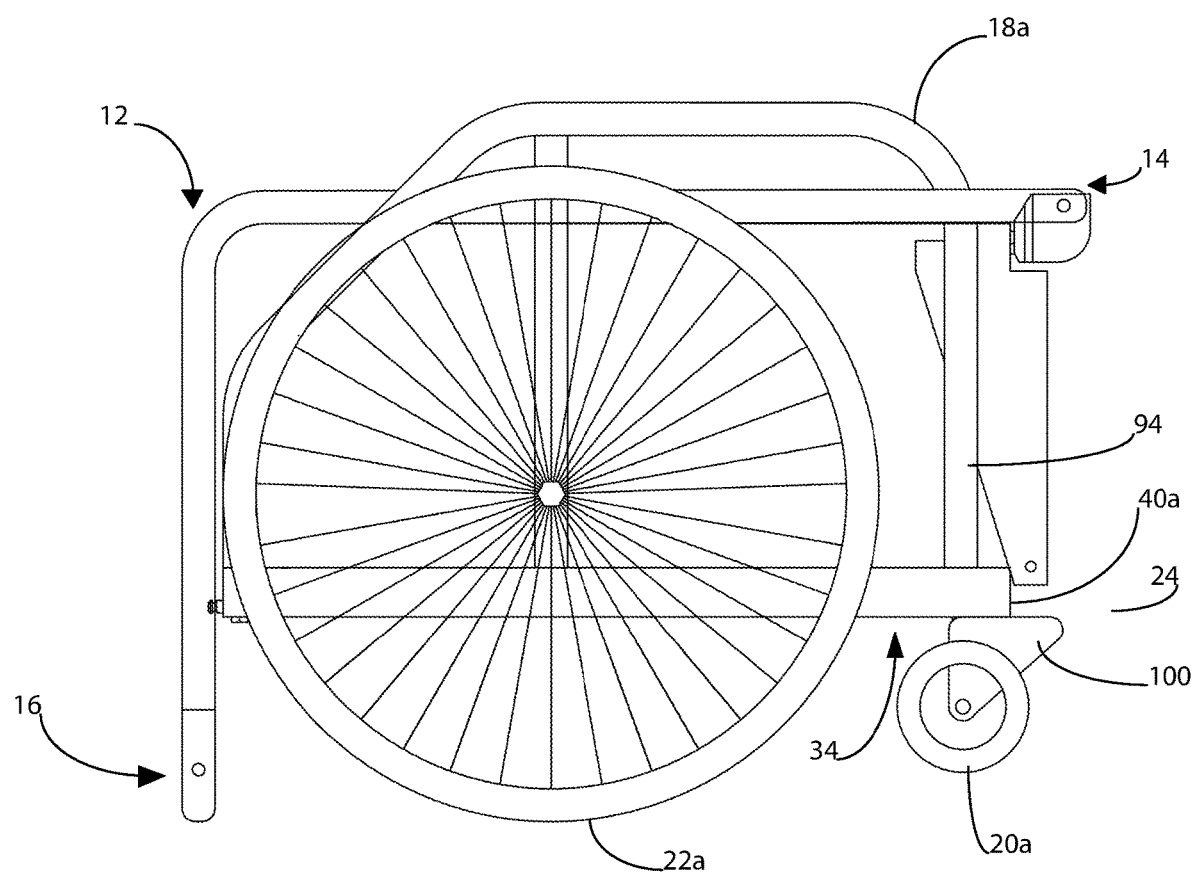
FIG. 7 is side view of the utility cart in the fully stowed or folded position.

The rods 32a, 32b, 32c may be made of lightweight aluminum, steel, titanium, carbon composites or durable thermoplastics and combinations thereof. As shown in FIG. 4, the rod 32a may extend through the linear opening formed by the plurality of hinges 38 of the first support assembly 25a and the plurality of hinges 52 of the second support assembly 25b, the rod 32b may extend through the linear opening formed by of the plurality of hinges 67 of the fifth support assembly 31a and the plurality of hinges 73 of the sixth support assembly 31b, and the rod 32c may extend through the linear opening formed by the plurality of hinges 55 of the third support assembly 27a and the plurality of hinges 61 of the fourth support assembly 27b. In this way, the first panel member 28 and the second panel member 30 may be movable in unison relative to the first and second bracket assemblies 24, 26 between a folded position (FIGS. 6 and 7) in which the first and second panel members 28, 30 are extended vertically and an unfolded position (FIGS. 1-3) in which the first and second panel members 28, 30 are extended horizontally.

A pair of caps 68 may be securely attached to opposing ends of the rod 32a to prevent the rod 32a from being removed from the linear opening formed by the plurality of hinges 38 of the first support assembly 25a and the plurality of hinges 52 of the second support assembly 25b. A pair of caps 70 may be securely attached to opposing ends of the rod 32c to prevent the rod 32c from being removed from the linear opening formed by the plurality of hinges 55 of the third support assembly 27a and the plurality of hinges 61 of the fourth support assembly 27b. A cap 72 may be securely attached to one end of the rod 32b and the yoke 14 may be threadably attached or welded to another end of the rod 32b to prevent the rod 32b from being removed from the linear opening formed by the plurality of hinges 67 of the fifth support assembly 31a and the plurality of hinges 73 of the sixth support assembly 31b.

As shown in FIG. 4, the U-shaped yoke 14 may be made of lightweight aluminum, steel, titanium, carbon composites or durable thermoplastics and combinations thereof and may be threadably attached, mechanically fastened, adhesively attached, or welded to the another end of the rod 32b. The yoke 14 may include a first aperture 74, a second aperture 76 and a U-shaped recess 78 between the first and second apertures 74, 76. The first aperture 74 and the second aperture 76 may be aligned with each other. An end of the handle 16 may be disposed in the U-shaped recess 78 of the yoke 14 and may include apertures (not shown) that are aligned with the first and second apertures 74, 76 of the yoke 14. In this way a pin 82 may be extended through the apertures 74, 76 of the yoke 14 and the apertures (not shown) of the handle 16 such that the handle may be pivotable between a secure state (FIGS. 6 and 7) when the first and second panel members 28, 30 are in the folded position and a release state (FIGS. 1-4) when the first and second panel members 28, 30 are in the unfolded position. The pins 82 may be spring loaded pins, such as those shown in FIGS. 11(a)-11(e), for example. When the handle 16 is in the locked state and the first and second panel members 28, 30 are in the unfolded position, the user (not shown) may grasp the handle 16 to transport the cart 10 from one place to another.

In some configurations, a first handle support 84 made of lightweight aluminum, steel, titanium, carbon composites or durable thermoplastics and combinations thereof may be attached (e.g., welded, bolted, riveted and/or adhered) at or near an end of the first panel member 28 and a second handle support 86 made of lightweight aluminum, steel, titanium, carbon composites or durable thermoplastics and compositions thereof may be attached (e.g., welded, bolted, riveted and/or adhered) at or near an end of the second panel member 30. The first and second handle supports 84, 86 may cooperate to form a circular opening 88 when the first and second panel members 28, 30 are in the unfolded position (FIG. 2). A portion of the handle 16 may extend through the opening 88 formed by the first and second handle supports 84, 86 such that apertures (not shown) of the handle 16 align with an aperture 90 of the first handle support 84 and an aperture (not shown) of the second handle support 86. In this way, an optional locking pin 92 may extend through the apertures (not shown) of the handle 16, the aperture 90 of the first handle support 84 and the aperture (not shown) of the second handle support 86 to restrict the handle 16 from pivoting when the first and second panel members 28, 30 are in the unfolded position and the handle 16 is in the release state.

Figure 8:
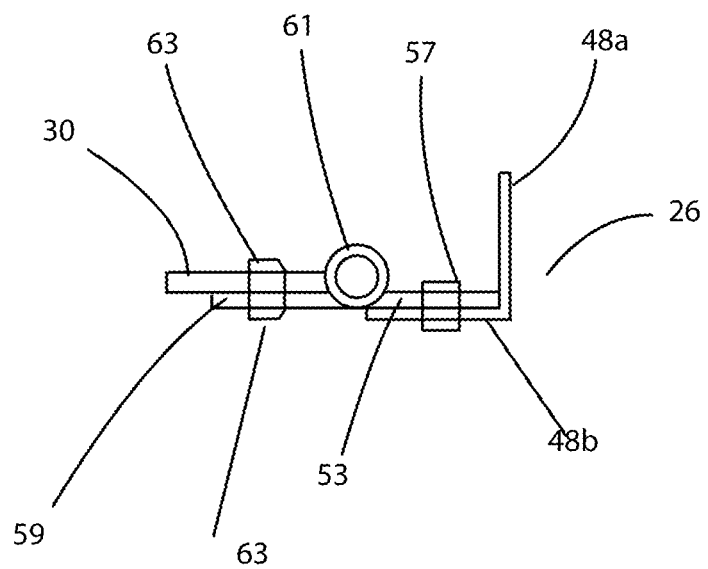
FIG. 8 is a cross-sectional view of the utility cart taken along line A-A of FIG. 2.
Figure 9:
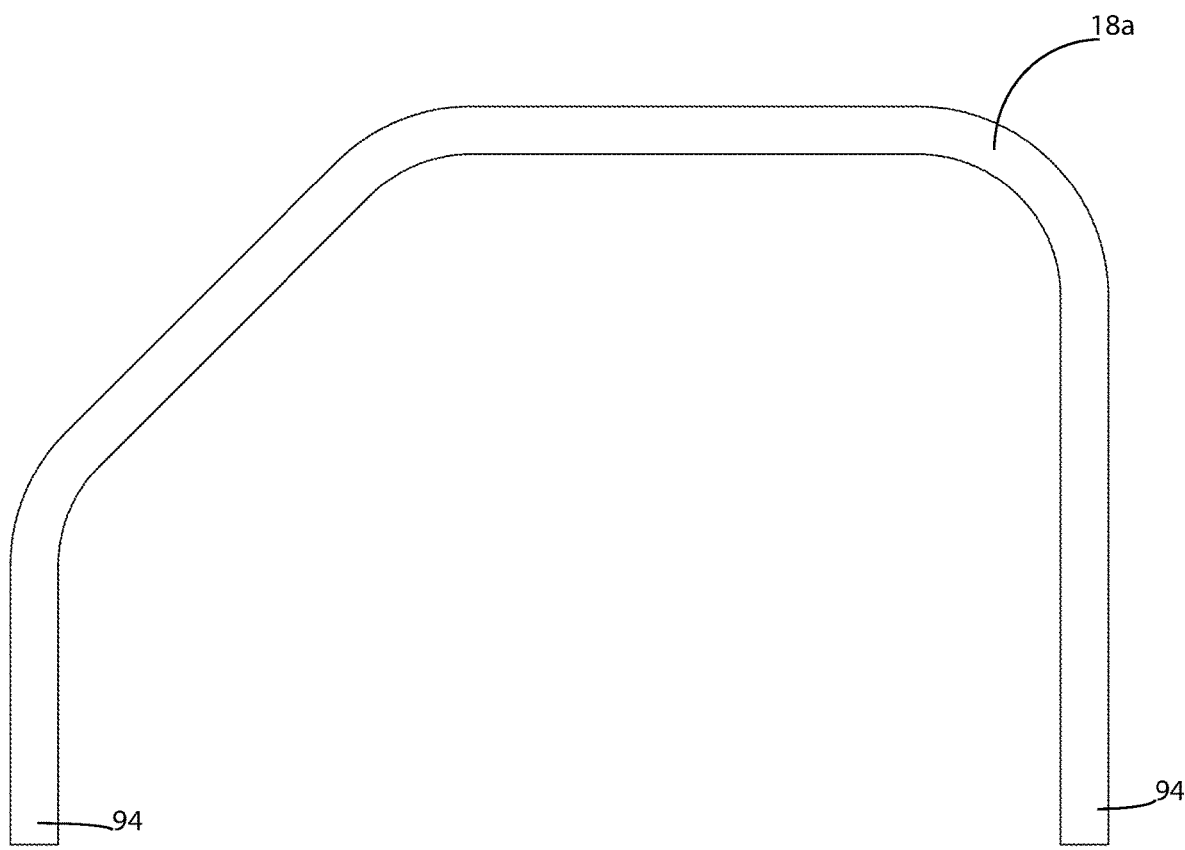
FIG. 9 is a side view of one of two (2) rails of the utility cart.

As shown in FIG. 8, the substantially U-shaped rail 18a may be made of lightweight aluminum, steel, titanium, carbon composites or durable thermoplastics and combinations thereof and may have ends 94 that are removably disposed in a respective seat 36 of the first bracket assembly 24 such that the rail 18a is securely attached to the floor apparatus 12. The substantially U-shaped rail 18b may be made of lightweight aluminum, steel, titanium, carbon composites or durable thermoplastics and combinations thereof and may have ends 96 that are removably disposed in a respective seat 44 of the second bracket assembly 26 such that the rail 18b is securely attached to the floor apparatus 12.

The first wheel 20a may be removably and rotatably attached to a bottom side 98 of the second member 40b of the bracket 34 (via a first wheel support 100) at or near a front portion thereof. The first wheel 20a may also include a brake 102 that is operable between a locked state in which the first wheel 20a is prevented from rotating and an unlocked state in which the first wheel 20b is permitted to rotate. The first wheel 20b may be removably and rotatably attached to a bottom side 104 of the second member 48 of the bracket 42 (via a first wheel support (not shown)) at or near a front portion thereof. The first wheel 20b may also include a brake 108 that is operable between a locked state in which the first wheel 20b is prevent from rotating and a unlocked state in which the first wheel 20b is permitted to rotate. It should be understood that the brake 108 of the first wheel 20b and the brake 102 of the first wheel 20a may be operable independently of each other. It should also be understood that the first pair of wheels 20a, 20b are removed from the cart 10 when the cart 10 is attached to and transported by the vehicle.

The second wheel 22a may be rotatably attached to the wheel support 39 of the first bracket assembly 24 and the second wheel 22b may be rotatably attached to the wheel support (not shown) of the second bracket assembly 26. The second pair of wheels 22a, 22b may have a wider diameter than the first pair of wheels 20a, 20b such that the floor apparatus 12 is positioned (i.e., raised) 8 inches, for example, above a surface (not shown) that the second pair of wheels 22a, 22b and the first pair of wheels 20a, 20b are disposed on. The first pair of wheels 20a, 20b and the floor apparatus 12 may be disposed between the second pair of wheels 22a, 22b when the utility cart 10 is in the stowed position (FIGS. 6 and 7; the first and second panel members 28, 30 are in the folded position and the handle 16 is in the secure state) and the deployed position (FIGS. 2 and 3; the first and second panel members 28, 30 are in the unfolded position and the handle 16 is in the release state). Because one aspect of the present invention is ease of use under certain embodiments, when the utility cart 10 is in the stowed position (FIGS. 6 and 7), the utility cart 10 may be less than or equal to 10.5 inches wide and less than 20 pounds. In this manner, the utility cart 10 may be conveniently packaged and shipped to the user (not shown) via a carrier, for example and maintains a small footprint during storage or on store shelves.

Figure 10:
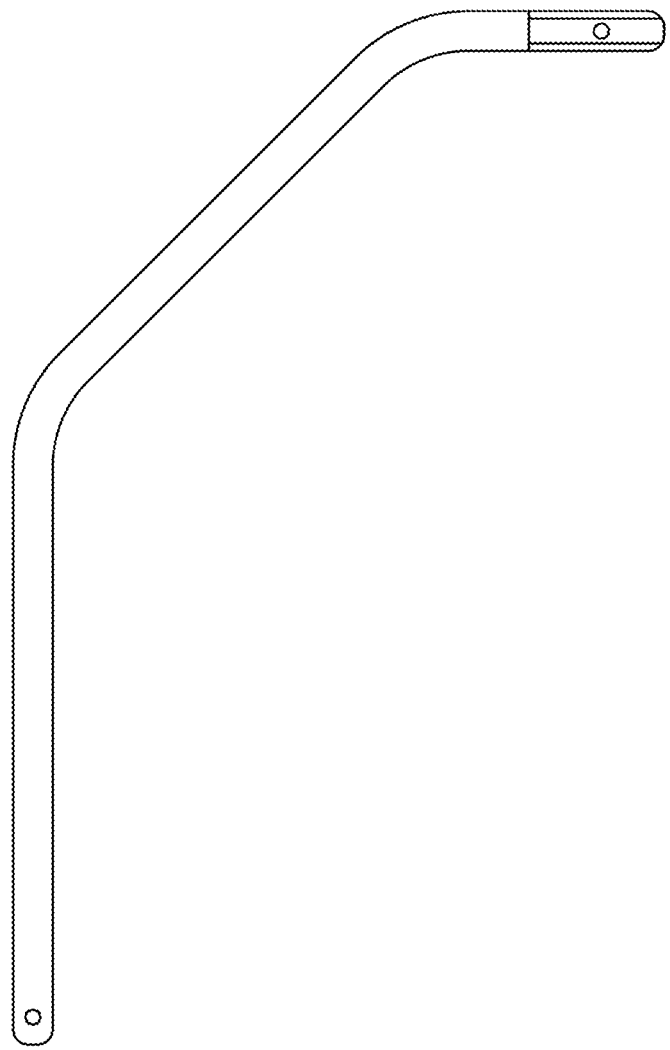
FIG. 10 is a side view of an alternate extension handle for use with a vehicle.
Figure 11A:
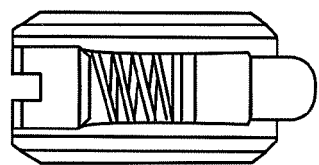
Figure 11B:
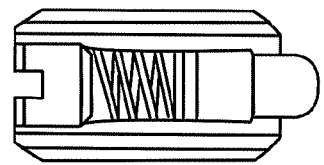
Figure 11C:
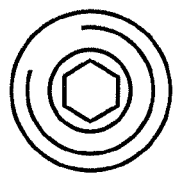
Figure 11D:
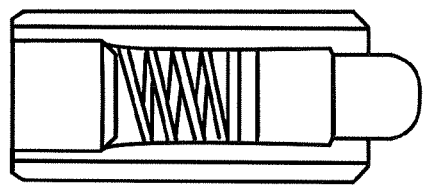
Figure 11E:
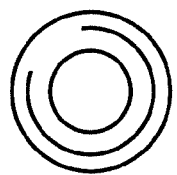

In some configurations, as shown in FIG. 10, an alternate handle 116 may be included that also allows for the utility cart 10 to be attached to a vehicle such as a bicycle, motor scooter, tractor an all-terrain vehicle by way of non-limiting example.

With reference to FIGS. 12-17, another utility cart 210 is provided. The structure and function of the utility cart 210 may be identical or similar to the utility cart 10 described above, apart from any exception noted below.

The utility cart 210 may be movable between a stowed position (FIGS. 16 and 17) in which the utility cart 210 which is constructed to be both durable, and, at the same time, lightweight, can be conveniently packaged and shipped via a carrier, for example, and a deployed position (FIGS. 12 and 13) in which the utility cart 210 may be usable (e.g., transport the cargo from one place to another).

The utility cart 210 may include a floor apparatus 212, a U-shaped yoke 214, a handle 216, a pair of rails 218a, 218b, a first pair of wheels 220a, 220b and a second pair of wheels 222a, 222b. The floor apparatus 212 may include a first bracket assembly 224, a second bracket assembly 226, first slats or planks 228, second slats or planks 230, an attachment assembly 231 and a plurality of rods 232a, 232b, 232c.

The first bracket assembly 224 may be made of lightweight aluminum, steel, titanium, carbon composites or durable thermoplastics and combinations thereof and include an L-shaped bracket 234, a girder 236, an elongated plate 237, and a plurality of hinges 238. The bracket 234 may include a first member 248a and a second member 248b extending perpendicularly from the first member 248a. The girder 236 may be rectangular-shaped and may be made of a metallic material. The girder 236 may be seated on the first member 248a of the bracket 234 when the cart 210 is in the deployed position and may be removed from the first member 248a when the cart 210 is in the stowed position. The girder 236 may be hollow and may be attached (welded, mechanically fastened, or any other suitable attachment means) to the elongated plate 237. The elongated plate 237 may be made of a metallic material. A plurality of hinges 241 may be integral with the elongated plate 237 such that the plurality of hinges 241 are spaced apart from each other and extend from a side of the elongated plate 237. The plurality of hinges 238 may be attached (e.g., welded and/or riveted) to the second member 248b and may be disposed in a corresponding space adjacent to the hinges 241 such that the plurality of hinges 238 and the plurality hinges 241 are arranged in an alternating fashion.

The second bracket assembly 226 may be made of lightweight aluminum, steel, titanium, carbon composites or durable thermoplastics and combinations thereof and include an L-shaped bracket 242, a girder 244, an elongated plate 245 and a plurality of hinges 246. The bracket 242 may include a first member 248a and a second member 248b extending perpendicularly from the first member 248a. The girder 244 may be rectangular-shaped and may be made of a metallic material. The girder 244 may be hollow and may be attached (welded, mechanically fastened, or any other suitable attachment means) to the elongated plate 245. The girder 244 may be seated on the first member 248a of the bracket 242 when the cart 210 is in the deployed position and may be removed from the first member 248a when the cart 210 is in the stowed position. The elongated plate 245 may be made of a metallic material. A plurality of hinges 247 may be integral with the elongated plate 245 such that the plurality of hinges 247 are spaced apart from each other and extend from a side of the elongated plate 245. The plurality of hinges 246 may be attached (e.g., welded and/or riveted) to the second member 248b and may be disposed in a corresponding space adjacent to the hinges 247 such that the plurality of hinges 246 and the plurality hinges 247 are arranged in an alternating fashion.

The rectangular-shaped first slats 228 may be made of lightweight aluminum, steel, titanium, carbon composites or durable thermoplastics and combinations thereof and may extend perpendicular to the girder 236 and the elongated plate 237. The first slats 228 may be spaced apart from each other and maybe attached (e.g., welded, mechanically fastened or attached by any other suitable means) to the attachment assembly 231 at a first end and to at least one of the girder 236 and the elongate plate 237 at a second end opposing the first end. That is, the second end maybe disposed in a channel 250 formed in a lateral side of the girder 236 and may be attached to at least one of the girder 236 and the elongated plate 237.

The rectangular-shaped second slats 230 may be made of lightweight aluminum, steel, titanium, carbon composites or durable thermoplastics and combinations thereof and may extend perpendicular to the girder 244 and the elongated plate 245. The second slats 230 may be spaced apart from each other and maybe attached (e.g., welded, mechanically fastened or attached by any other suitable means) to the attachment assembly 231 at a first end and to at least one of the girder 244 and the elongate plate 245 at a second end opposing the first end. That is, the second end maybe disposed in a channel 252 formed in a lateral side of the girder 244 and may be attached to at least one of the girder 244 and the elongated plate 245.

A locking pin 253a extends through the elongated plate 237, the girder 236 and the first member 248a and a locking pin 253b extends through the elongated plate 245, the girder 244 and the first member 248a when the cart 210 is in the deployed position to secure the cart 210 in the deployed position (i.e., prevent the cart 210 from being moved to the stowed position). The locking pins are located generally along the forward end of the cart 210 (handle end).

The attachment assembly 231 may include first and second elongated girders 254, 256. The first girder 254 may form a channel (not shown) at a lateral side that the first end of each slat 228 is disposed. At least one hinge 258 may be attached to the first girder 254 such that each hinge 258 is spaced apart from each other and extend from the girder 254. The second girder 256 may form a channel (not shown) at a lateral side that the first end of each slat 230 is disposed. At least one hinge 262 may be attached to the second girder 256 such that each hinge 258 is spaced apart from each other and extend from the girder 256. Each hinge 262 may be disposed in a corresponding space adjacent to the hinges 258 such that the hinges 258 and the hinges 262 are arranged in an alternating fashion. The hinges 258 and hinges 262 are hidden from the user's view when the utility cart 210 is in the deployed position, which improves the aesthetics of the utility cart 210 and optimizes the total surface area usable by the user.

A first handle support 264 made of lightweight aluminum, steel, titanium, carbon composites or durable thermoplastics and combinations thereof may be attached (e.g., welded, bolted, riveted and/or adhered) at or near an end of the first girder 254 and a second handle support 266 made of lightweight aluminum, steel, titanium, carbon composites or durable thermoplastics and compositions thereof may be attached (e.g., welded, bolted, riveted and/or adhered) at or near an end of the second girder 256. The first and second handle supports 264, 266 may cooperate to form a circular opening (not shown) when the cart 210 is in the deployed position. A portion of the handle 216 may extend through the opening formed by the first and second handle supports 264, 266. A locking pin (not shown) may extend through apertures (not shown) of the handle 216 and the handle supports 264, 266 to restrict the handle 216 from pivoting when the cart 210 is in the deployed position and the handle 216 is in a release state. The handle is stored along the top side of the cart 210 when the slats 228, 230 are collapsed into a folded position.

The rods 232a, 232b, 232c may be made of lightweight aluminum, steel, titanium, carbon composites or durable thermoplastics and combinations thereof. The rod 232a may extend through openings (not shown) of the plurality of hinges 238 and 241, the rod 232b may extend through openings (not shown) of the plurality of hinges 246, 247, and the rods 232c may extends through openings (not shown) of the hinges 258, 262. In this way, the first slats 228 and the second slats 230 may be movable in unison relative to the first and second bracket assemblies 224, 226 between a folded position in which the first and second slats 228, 230 are extended vertically and an unfolded position in which the first and second slats 228, 230 are extended horizontally.

The structure and function of the yoke 214 is similar or identical to the yoke 14 described above, and therefore, will not be described again in detail. The yoke 214 allows for 180 degree rotation of the handle 216 to facilitate storing of the handle 216 when the cart 210 is in the stowed position.

The structure and function of the handle 216 is similar or identical to the handle 216 described above, and therefore, will not be described again in detail. The structure and function of the rails 218, 218b is similar or identical to the rails 18a, 18b, respectively, described above, and therefore, will not be described again in detail. The rails 218a, 218b have been repositioned along the outside of the brackets 234, 242, respectively, to afford adequate space of components (the girder 236, 244) of the utility cart 210. A first cross bar 268 may be attached to the bracket 234 at one end and a top of the rail 218a at another end and may provide additional structural support thereto. A second cross bar 270 may be attached to the bracket 242 at one end and a top of the rail 218b at another end and may provide additional structural support thereto.

The structure and function of the wheels 220a, 220b is similar or identical to the wheels 20a, 20b, respectively, described above, and therefore, will not be described again in detail.

The structure and function of the wheels 222a, 222b is similar or identical to the wheels 22a, 22b, respectively, described above, and therefore, will not be described again in detail. The wheel 222a is attached to the utility cart 210 at the cross bar 268 and the wheel 222b is attached to the utility cart 210 at the cross bar 270.

Under this embodiment, the flooring apparatus has been modified such that a discontinuous floor is utilized. By utilizing a discontinuous floor, both material and weight savings advantages are gained.

With reference to FIGS. 18-22, another utility cart 310 is provided. The structure and function of the utility cart 310 may be identical or similar to the utility carts 10, 210 described above, apart from any exception noted below. The utility cart 310 may include hinges that are intermittently positioned along a length of the cart 310 at respective sides and a center. The handle of the cart 310 may be secured over the top of the flooring apparatus when the cart 310 is in a stowed position, thereby facilitating handling of the cart 310 in the stowed position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A utility cart comprising:
a flooring apparatus including first and second bracket assemblies and first and second panel members, the first and second panel members movable relative to the first and second bracket assemblies between an unfolded position in which the first and second panel members extend horizontally and a folded position in which the first and second panel members extend vertically; and a pair of wheels, one wheel of the pair of wheels attached to the first bracket assembly and another wheel of the pair of wheels attached to the second bracket assembly, wherein the flooring apparatus is disposed between the pair of wheels when the first and second panel members are in the unfolded position and the folded position, wherein the first panel member is hinged to the first bracket assembly and the second panel member is hinged to the second bracket assembly and the first panel member such that the first and second panel members move in unison relative to the first and second bracket assemblies between the folded and unfolded position, wherein the first panel member includes one or more first hinges attached at a periphery and the second panel member includes one or more second hinges attached at a periphery, the one or more first hinges and the one or more second hinges are hidden from top sides of the first and second panel members when first and second panel members are in the unfolded position.

2. The utility cart of claim 1, further comprising a first handle support attached to an end of the first panel member and a second handle support attached to an end of the second panel member, and wherein the first and second handle supports cooperate to form an opening when the first and second panel members are in the unfolded position.

3. The utility cart of claim 2, further comprising a handle, a portion of the handle extending at least partially through the opening when the first and second panel members are in the unfolded position to prevent rotation of the handle.

4. The utility cart of claim 1, wherein a rod extends through the one or more first hinges and the one or more second hinges to hinge the first and second panel members to each other, and wherein a yoke is attached to the rod.

5. The utility cart of claim 4, further comprising a handle that is pivotally attached to the yoke.

6. The utility cart of claim 1, wherein the first and second panel members are made of a lightweight aluminum, steel, titanium, or carbon composite material.

7. The utility cart of claim 1, wherein a first rail is seated on the first bracket assembly and a second rail is seated on the second bracket assembly, and wherein the first and second rails are positioned between the pair of wheels when the first and second panel members are in the folded and unfolded position.

8. A utility cart comprising:
a flooring apparatus including first and second bracket assemblies, at least one first plank and at least one second plank, each of the first and second planks movable relative to the first and second bracket assemblies between an unfolded position in which each of the first and second planks extend horizontally and a folded position in which each of the first and second planks extend vertically;

a pair of wheels, one wheel of the pair of wheels attached to the first bracket assembly and another wheel of the pair of wheels attached to the second bracket assembly; and a first girder attached to each of the first planks and a second girder attached to each of the second planks, the first and second girders hinged to each other such that each of the first and second planks move in unison between the folded position and the unfolded position;

wherein the flooring apparatus is disposed between the pair of wheels when each of the first and second planks are in the unfolded position and the folded position;

wherein the first girder includes a plurality of first hinges attached at a periphery and spaced apart from each other and the second girder includes a plurality of second hinges attached at a periphery and disposed in a corresponding space adjacent to the first hinges such that the plurality of first hinges and the plurality second hinges are arranged in an alternating fashion, the first and second hinges are hidden from top sides of the first and second girders when each of the first and second planks are in the unfolded position.

9. The utility cart of claim 8, further comprising a first handle support attached to an end of the first girder and a second handle support attached to an end of the second girder, and wherein the first and second handle supports cooperate to form an opening when each of the first and second planks are in the unfolded position.

10. The utility cart of claim 9, further comprising a handle, a portion of the handle extending at least partially through the opening when each of the first and second planks are in the unfolded position to prevent rotation of the handle.

11. The utility cart of claim 8, wherein the first bracket assembly includes a first bracket and a third girder, and wherein each of the first planks is attached to the third girder and the third girder is hinged to the first bracket.

12. The utility cart of claim 11, wherein the second bracket assembly includes a second bracket and a fourth girder, and wherein each of the second planks are attached to the fourth girder and the fourth girder is hinged to the second bracket.

13. The utility cart of claim 8, wherein each of the first and second planks is made of a lightweight aluminum, steel, titanium, or carbon composite material.

14. The utility cart of claim 8, wherein a first rail is attached to the first bracket assembly and a second rail is attached to the second bracket assembly, and wherein the first and second rails are positioned between the pair of wheels when each of the first and second planks are in the folded and unfolded position and the first and second bracket assemblies are positioned between the first and second rails when each of the first and second planks are in the folded and unfolded position.

* * * * *